US010556413B2

(12) United States Patent
Cossins

(10) Patent No.: US 10,556,413 B2
(45) Date of Patent: Feb. 11, 2020

(54) METHOD FOR ASSEMBLY OF RECESSED PANEL DOORS

(71) Applicant: JELD-WEN UK, Ltd., Sheffield, South Yorkshire (GB)

(72) Inventor: Trevor Cossins, Penrith (GB)

(73) Assignee: JELD-WEN UK, Ltd., Sheffield (GB)

( * ) Notice: Subject to any disclaimer, the term of this patent is extended or adjusted under 35 U.S.C. 154(b) by 342 days.

(21) Appl. No.: 15/260,593

(22) Filed: Sep. 9, 2016

(65) Prior Publication Data

US 2017/0072672 A1 Mar. 16, 2017

Related U.S. Application Data

(60) Provisional application No. 62/217,710, filed on Sep. 11, 2015.

(51) Int. Cl.
*B32B 3/30* (2006.01)
*B32B 37/10* (2006.01)
*B32B 3/12* (2006.01)
*B32B 29/00* (2006.01)
*E06B 3/82* (2006.01)

(52) U.S. Cl.
CPC .............. *B32B 37/10* (2013.01); *B32B 3/12* (2013.01); *B32B 3/30* (2013.01); *B32B 29/002* (2013.01); *E06B 3/822* (2013.01); *B32B 2250/40* (2013.01); *B32B 2317/12* (2013.01); *B32B 2419/00* (2013.01)

(58) Field of Classification Search
CPC .................................. B32B 3/30; E06B 3/822
USPC ........................................... 156/583.1, 583.3
See application file for complete search history.

(56) References Cited

U.S. PATENT DOCUMENTS

| 670,939 A | 4/1901 | Rapp |
| 1,183,842 A | 5/1916 | Alling |
| 2,196,470 A | 4/1940 | Montgomery et al. |
| 2,419,346 A | 4/1947 | Ellis |
| 2,511,620 A | 6/1950 | MacMillan |
| 2,608,500 A | 8/1952 | Del |
| 2,670,026 A | 2/1954 | Ungar |
| 2,674,295 A | 4/1954 | Steele et al. |
| 2,695,430 A | 11/1954 | Wakefield |
| 2,765,056 A | 10/1956 | Tyree |
| 2,791,809 A | 5/1957 | Lincoln, Jr. |
| 2,809,403 A | 10/1957 | Clements |
| 2,827,670 A | 3/1958 | Schwindt |
| 2,828,235 A | 3/1958 | Holland et al. |
| 2,848,132 A | 8/1958 | Davous |
| 2,893,076 A | 7/1959 | Herts |
| 2,950,038 A | 8/1960 | Rupp |
| 2,980,573 A | 4/1961 | Clifford |

(Continued)

FOREIGN PATENT DOCUMENTS

DE 195 44 653 C1 4/1997

*Primary Examiner* — Scott W Dodds
(74) *Attorney, Agent, or Firm* — Stoel Rives LLP

(57) ABSTRACT

Systems and methods for pressing a door assembly involve one or more die sections installed in a press, wherein the die sections each have a raised section that contacts and supports a recessed panel portion of a door skin of the assembly during the pressing operation to facilitate crushing of portions of a core of the door assembly that underlie the recessed panel portion of the door skin. The die sections may be made of plastic and readily changed out for different sizes or styles of doors.

15 Claims, 4 Drawing Sheets

(56) References Cited

U.S. PATENT DOCUMENTS

| | | |
|---|---|---|
| 3,018,205 A | 1/1962 | Barut |
| 3,049,461 A | 8/1962 | Beahm et al. |
| 3,070,198 A | 12/1962 | Haskell |
| 3,079,887 A | 3/1963 | Dawkins |
| 3,227,599 A | 1/1966 | Holland et al. |
| 3,296,059 A | 1/1967 | Schwindt |
| 3,342,666 A | 9/1967 | Hull |
| 3,385,002 A | 5/1968 | Quinif |
| 3,389,665 A | 6/1968 | Kauffman |
| 3,405,659 A | 10/1968 | Hees |
| 3,464,367 A | 9/1969 | Latter |
| 3,493,450 A | 2/1970 | Judge |
| 3,501,367 A | 3/1970 | Parker |
| 3,581,675 A | 6/1971 | Kauffman |
| 3,593,671 A | 7/1971 | Bramlett |
| 3,594,989 A | 7/1971 | Bastiaans |
| 3,618,535 A | 11/1971 | Hees |
| 3,704,563 A | 12/1972 | Arthur |
| 3,709,161 A | 1/1973 | Kauffman |
| 3,823,675 A | 7/1974 | Farley |
| 4,007,409 A | 2/1977 | Sewell |
| 4,084,367 A | 4/1978 | Saylor et al. |
| 4,085,762 A | 4/1978 | O'Brian |
| 4,109,587 A | 8/1978 | Jansen |
| 4,130,682 A | 12/1978 | Lauko |
| 4,194,313 A | 3/1980 | Downing |
| 4,236,365 A | 12/1980 | Wheeler |
| 4,247,237 A | 1/1981 | Brown |
| 4,265,067 A | 5/1981 | Palmer |
| 4,291,080 A | 9/1981 | Ely et al. |
| 4,294,055 A | 10/1981 | Andresen et al. |
| 4,300,864 A | 11/1981 | Liebel et al. |
| 4,349,303 A | 9/1982 | Liebel et al. |
| 4,363,579 A | 12/1982 | Rogers |
| 4,372,717 A | 2/1983 | Sewell et al. |
| 4,386,881 A | 6/1983 | Liebel |
| 4,431,474 A * | 2/1984 | Gronek .................. H01R 43/02 100/295 |
| 4,494,897 A | 1/1985 | Rogers |
| 4,516,891 A | 5/1985 | Wnuk et al. |
| 4,579,613 A | 4/1986 | Belanger |
| 4,583,338 A | 4/1986 | Sewell et al. |
| 4,585,381 A | 4/1986 | Boyse |
| 4,643,787 A | 2/1987 | Goodman |
| 4,677,012 A | 6/1987 | Anderson |
| 4,685,986 A | 8/1987 | Anderson |
| 4,796,369 A | 1/1989 | Hamann |
| 4,811,538 A | 3/1989 | Lehnert et al. |
| 4,865,889 A | 9/1989 | Boyse |
| 4,896,471 A | 1/1990 | Turner |
| 4,928,415 A | 5/1990 | Walters |
| 4,948,445 A | 8/1990 | Hees |
| 5,062,751 A | 11/1991 | Liebel |
| D327,433 S | 6/1992 | Sewell |
| 5,132,156 A | 7/1992 | Trassure, Jr. et al. |
| 5,139,842 A | 8/1992 | Sewell |
| 5,142,835 A | 9/1992 | Mrocca et al. |
| 5,152,647 A | 10/1992 | Sewell |
| 5,155,959 A | 10/1992 | Richards et al. |
| D331,014 S | 11/1992 | Sewell |
| D331,193 S | 11/1992 | Nilsen |
| 5,167,105 A | 12/1992 | Isban et al. |
| 5,171,114 A | 12/1992 | Dunn |
| D345,502 S | 3/1994 | Clar |
| 5,296,820 A | 3/1994 | Lin et al. |
| 5,306,100 A | 4/1994 | Higginbotham |
| 5,328,744 A | 7/1994 | Kaufmann et al. |
| 5,465,672 A | 11/1995 | Boyse et al. |
| 5,466,211 A | 11/1995 | Komarek |
| 5,486,078 A | 1/1996 | Wise |
| 5,560,168 A | 10/1996 | Gagne et al. |
| 5,573,818 A | 11/1996 | Haywood et al. |
| 5,582,571 A | 12/1996 | Simpson et al. |
| 5,678,968 A | 10/1997 | Bourgeois et al. |
| 5,681,641 A | 10/1997 | Grigsby et al. |
| 5,690,601 A | 11/1997 | Cummings et al. |
| 5,701,621 A | 12/1997 | Landi |
| 5,714,226 A | 2/1998 | Disselbeck |
| 5,789,059 A | 8/1998 | Nomoto |
| 5,792,541 A | 8/1998 | Herrera |
| 5,845,439 A | 12/1998 | Hendley |
| 5,846,038 A | 12/1998 | Bostelman |
| 5,858,512 A | 1/1999 | Dit Picard et al. |
| 5,875,608 A | 3/1999 | Quinif |
| 5,875,609 A | 3/1999 | Quinif |
| 5,887,402 A | 3/1999 | Ruggie et al. |
| D407,647 S | 4/1999 | Merricks et al. |
| 5,992,127 A | 11/1999 | Quinif |
| 6,033,167 A | 3/2000 | Bourgeois |
| 6,073,419 A | 6/2000 | Moyes |
| 6,132,836 A | 10/2000 | Quinif |
| 6,170,224 B1 | 1/2001 | Boyse et al. |
| 6,319,586 B1 | 11/2001 | Colson |
| 6,485,800 B1 | 11/2002 | Liittschwager et al. |
| D470,414 S | 2/2003 | Hsu |
| 6,551,441 B1 | 4/2003 | Sato et al. |
| 6,743,318 B2 | 6/2004 | Vaders |
| 6,852,192 B2 | 2/2005 | Sato et al. |
| D527,558 S | 9/2006 | Ng et al. |
| 7,137,232 B2 | 11/2006 | Lynch et al. |
| 7,314,534 B2 | 1/2008 | Hardwick et al. |
| 7,390,447 B1 | 6/2008 | Clark et al. |
| 7,399,438 B2 | 7/2008 | Clark et al. |
| D584,621 S | 1/2009 | Jean |
| 7,481,900 B1 | 1/2009 | Quinif |
| 7,718,246 B2 | 5/2010 | Strauss |
| D617,642 S | 6/2010 | Jonzon et al. |
| 7,798,754 B2 | 9/2010 | Funk et al. |
| 7,819,163 B2 | 10/2010 | Tyler |
| D629,687 S | 12/2010 | Baker |
| 7,866,119 B2 | 1/2011 | Hardwick et al. |
| 7,919,186 B2 | 4/2011 | Clark et al. |
| 7,964,051 B2 | 6/2011 | Lynch et al. |
| 8,087,212 B2 | 1/2012 | Hardwick et al. |
| 8,123,895 B2 | 2/2012 | Tyler |
| 8,226,788 B1 | 7/2012 | Quinif |
| D667,727 S | 9/2012 | Diaz et al. |
| 8,256,177 B2 | 9/2012 | Pfau et al. |
| 8,317,959 B2 | 11/2012 | Hardwick et al. |
| 8,524,351 B2 | 9/2013 | Ross |
| 8,535,471 B2 | 9/2013 | Luetgert et al. |
| 8,590,273 B2 | 11/2013 | Hardwick et al. |
| 8,677,707 B2 | 3/2014 | Lynch et al. |
| 8,864,926 B2 | 10/2014 | Pfau et al. |
| 2003/0098117 A1 | 5/2003 | Vaders |
| 2007/0110979 A1* | 5/2007 | Clark ...................... B29C 70/30 428/292.1 |
| 2007/0172631 A1 | 7/2007 | Hugerholtz |
| 2008/0020172 A1 | 1/2008 | Boyse |
| 2008/0145597 A1 | 6/2008 | Hendren |
| 2008/0145599 A1 | 6/2008 | Khan |
| 2009/0297763 A1* | 12/2009 | Ross ........................ B32B 5/02 428/116 |
| 2010/0139835 A1 | 6/2010 | Giles |
| 2012/0027999 A1 | 2/2012 | Liang et al. |
| 2012/0141717 A1 | 6/2012 | Overton |
| 2013/0340926 A1 | 12/2013 | Liang |
| 2014/0260080 A1 | 9/2014 | Swartzmiller |
| 2014/0261991 A1 | 9/2014 | Cucchi |
| 2015/0004355 A1 | 1/2015 | Diaz et al. |
| 2015/0027630 A1* | 1/2015 | Cucchi ................... B32B 39/00 156/306.6 |
| 2015/0267461 A1 | 9/2015 | Parish |
| 2016/0339599 A1 | 11/2016 | Liang et al. |

* cited by examiner

METHOD FOR ASSEMBLY OF RECESSED PANEL DOORS

RELATED APPLICATION

This application claims the benefit under 35 U.S.C. § 119(e) from U.S. Provisional Patent Application No. 62/217,710, filed Sep. 11, 2015, which is incorporated herein by reference.

TECHNICAL FIELD

The field of the present disclosure relates to systems and methods for assembling doors.

BACKGROUND

A known method of assembling doors involves applying adhesive to an inside surface of two door skins; laying up a door assembly by stacking an internal frame and lightweight core material between the door skins; pre-pressing the door assembly to bring the adhesive into contact with the frame; and then feeding the pre-pressed doors into a separate heated press for curing the adhesive. Some such door skins include inwardly-contoured channels that simulate the sticking regions of a traditional solid wood door.

SUMMARY

In one embodiment, a system for making a door assembly from a stack of door components including first and second door skins, an internal frame, and a core, comprises a lower die section removably seated on a lower platen of a press and an upper die section removably attached to an upper platen of a press. At least one of the lower and upper die sections includes a base and one or more raised sections that stand off from the base to contact and support one or more recessed panel portions of the door skins during the pressing operation. The raised sections have a height above the base approximately equal to or greater than the depth of the recessed panel portions.

The upper and lower die sections are preferably made of a plastic material that is relatively soft and non-marring to reduce the possibility of damage to the door skins, and which is light weight to facilitate changing out the die sections for different sizes and styles of doors.

A method of making a door assembly includes seating a lower die section against a lower platen of a press, attaching an upper die section to an upper platen of the press, and positioning a door assembly within the press so that a raised section of the lower die section contacts the recessed panel portions of a first door skin of the door assembly. Thereafter, the method involves closing the press so that a raised section of the upper die section contacts the recessed panel portion of a second door skin of the door assembly, and pressing the door assembly between the upper and lower platens of the press with the recessed panel portions of the first and second door skins supported by the raised sections of the lower and upper die sections, respectively, so that the recessed panel portions press against the core of the door assembly to thereby compress and deform the core therebetween during pressing.

Additional aspects and advantages will be apparent from the following detailed description of preferred embodiments, which proceeds with reference to the accompanying drawings.

DETAILED DESCRIPTION OF PREFERRED EMBODIMENTS

Figure 1:
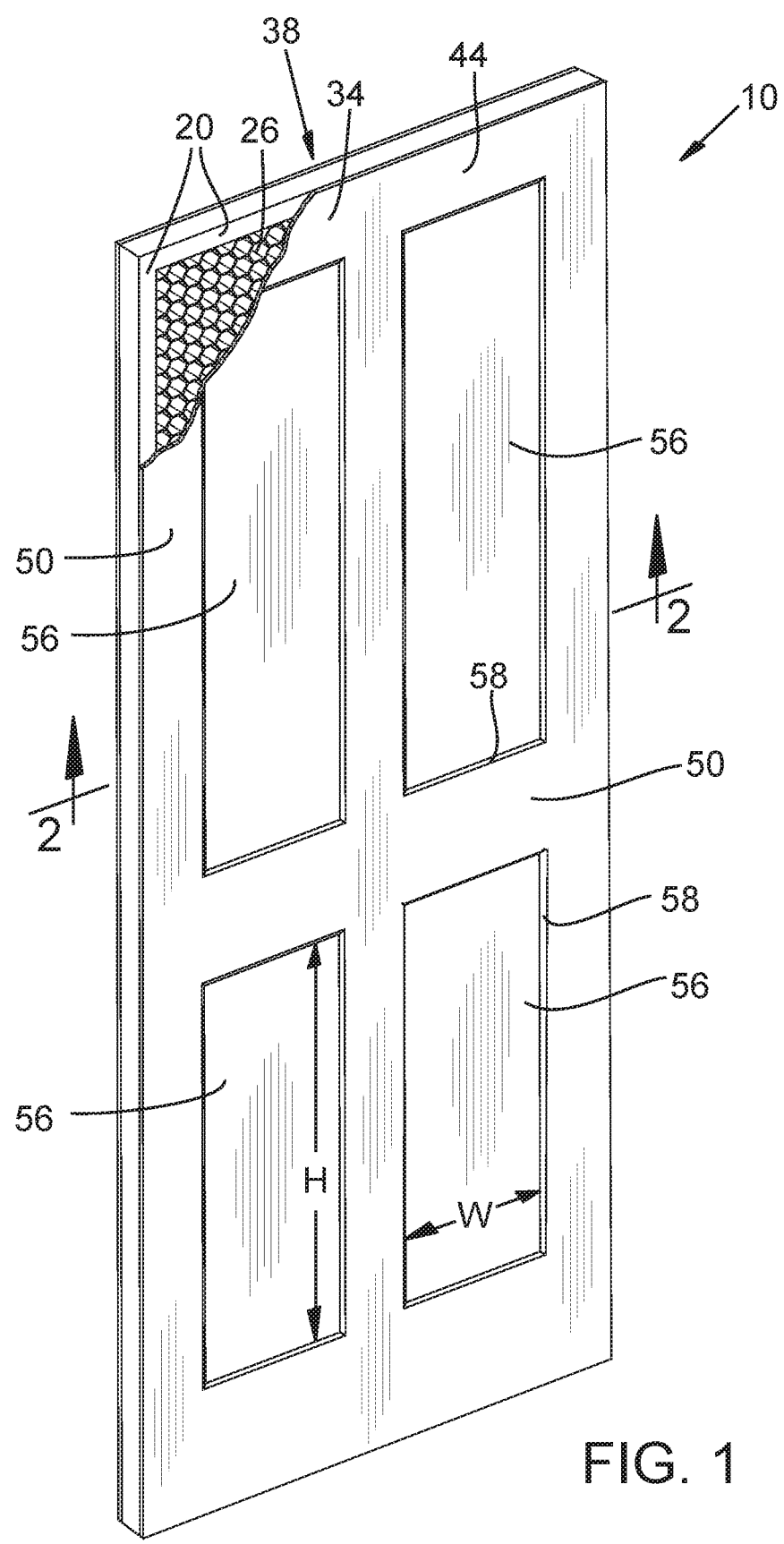
FIG. 1 is an isometric front view of a recessed-panel door, partially broken away to reveal an internal frame and expanded paper honeycomb core construction.
Figure 2:
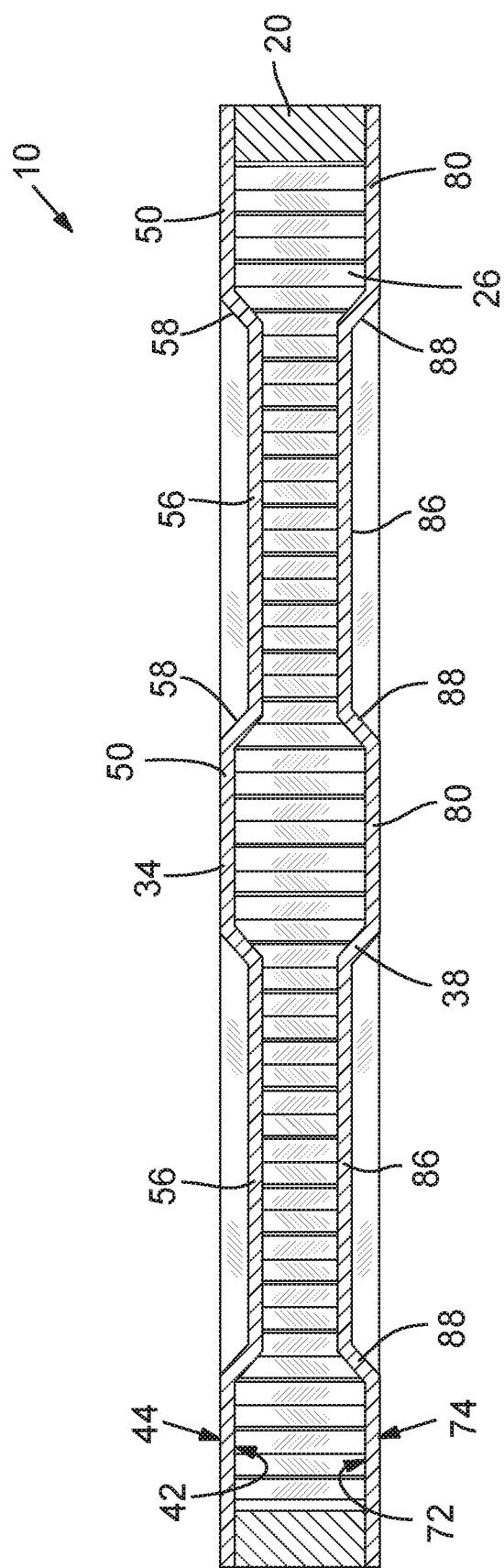
FIG. 2 is a schematic cross section view of the door of FIG. 1 taken along line 2-2 of FIG. 1 (not to scale).

FIGS. 1 and 2 show an exemplary door 10, made by the method and system disclosed herein. With reference to FIGS. 1-2, door 10 includes an internal frame 20 that extends around a perimeter of door 10 to define a cavity filled by a core 26. A first (or front) door skin 34 overlays a front surface of frame 20 and core 26. A second (or rear) door skin 38 (FIG. 2) overlays a rear surface of frame 20 and core 26 opposite the front surface. First door skin 34 includes an inner surface 42 which faces core 26 and frame 20 and an outer surface 44 which forms the front surface of door 10. Inner surface 42 is attached to the front surface of frame 20 by an adhesive. First door skin 34 preferably has a first planar portion 50 lying in a first plane. First planar portion 50 generally surrounds one or more recessed panel portions 56 (or panel regions) formed in first door skin 34, and may present the appearance of conventional stiles and rails. Recessed panel portions 56 appear as shallow indented regions in the outer surface 44 of first door skin 34, recessed relative to first planar portion 50. Recessed panel portions 56 may have a rectangular shape and planar surface as shown, or may have other regular or irregular shapes and contours contributing to the overall aesthetic design of door 10. Each recessed panel portion 56 may have a depth in the range of about 3-15 mm inwardly from first planar portion 50, for example, and may have width W in the range of about 50 mm to 1 m (or more typically in the range of about 100 mm to 800 mm) and a height H in the range of about 100 mm to 2.5 m (or more typically in the range of about 200 mm to 2 m). Transition regions 58, known in the art as "sticking" or simulated sticking, connect first planar portion 50 to recessed panel portions 56. First planar portion 50, panel portions 56, and transition regions 58 are preferably formed in a unitary sheet of material, such as molded high density fiberboard, for example, that has a substantially uniform thickness throughout (but may be somewhat thinner at transition regions 58). One suitable door skin is made of a fiber composite material having a thickness in the range of about 1.1 mm to 6 mm, or 2 mm to 4 mm, or 2.5 mm to 3.5 mm. When first door skin 34 includes multiple recessed panel portions 56, they are typically substantially co-planar in a second plane that is parallel to and spaced inwardly from the first plane of first planar portion 50. The recessed panel portions 56 characterize door 10 as a recessed-panel door.

Similarly, second door skin 38 includes an inner surface 72 which faces core 26 and frame 20 and an outer surface 74 forming a rear surface of door 10. Second door skin 38 is attached to the rear surface of frame 20 by an adhesive. In second door skin 38, simulated stiles and rails comprise a second planar portion 80 lying in a third plane spaced apart from the first and second planes of first door skin 34. Second planar portion 80 surrounds one or more recessed panel portions (or panel regions) 86 that are recessed relative to second planar portion 80. Transition regions 88 (sticking), connect second planar portion 80 to recessed panel portions 86. When second door skin 38 includes multiple panel portions 86, they are typically substantially co-planar in a fourth plane parallel to and spaced inwardly from the third plane of second planar portion 80. Recessed panel portions 86 may have similar dimensions in width, height, and depth as recessed panel portions 56 of first door skin 34, or different dimensions and depth. In an alternative embodiment (not shown), one of the first and second door skins 34, 38 may have a different ornamental design, different contours, different sticking, or panel regions that are not recessed, or may be entirely flat (flush) and lacking simulated sticking entirely.

In a preferred embodiment, core 26 comprises an expanded paper honeycomb material, which has a relatively high strength to weight ratio, but which is crushable by the press systems and methods described below. For example, the expanded paper honeycomb material of core 26 may have a compressive strength in the range of about 1.0 kg force per square cm ($kgf/cm^2$) to about 15 $kgf/cm^2$ (100 kPa to 1470 kPa) or more typically in the range of about 4 $kgf/cm^2$ to about 8 $kgf/cm^2$ (390 kPa to 785 kPa). Other structural materials that can be crushed or compressed under sufficient pressure may also be used for core 26, for example, expanded plastic film honeycomb material, corrugated cardboard, low density foam board, and others. Door skins 34, 38 are pre-formed in a door skin press process, including pre-forming recessed panel portions 56, 86 and transition regions 58, 88. Adhesive (not illustrated) is applied between first door skin 34 and frame 20 and between second door skin 38 and frame 20 to bond the door skins 34, 38 to frame 20. Frame 20 may be coated with adhesive before being stacked together with door skins 34, 38. Alternatively, door skins 34, 38 may be coated in the region of frame 20 or over their entire surface so they also adhere to core 26.

Figure 3:
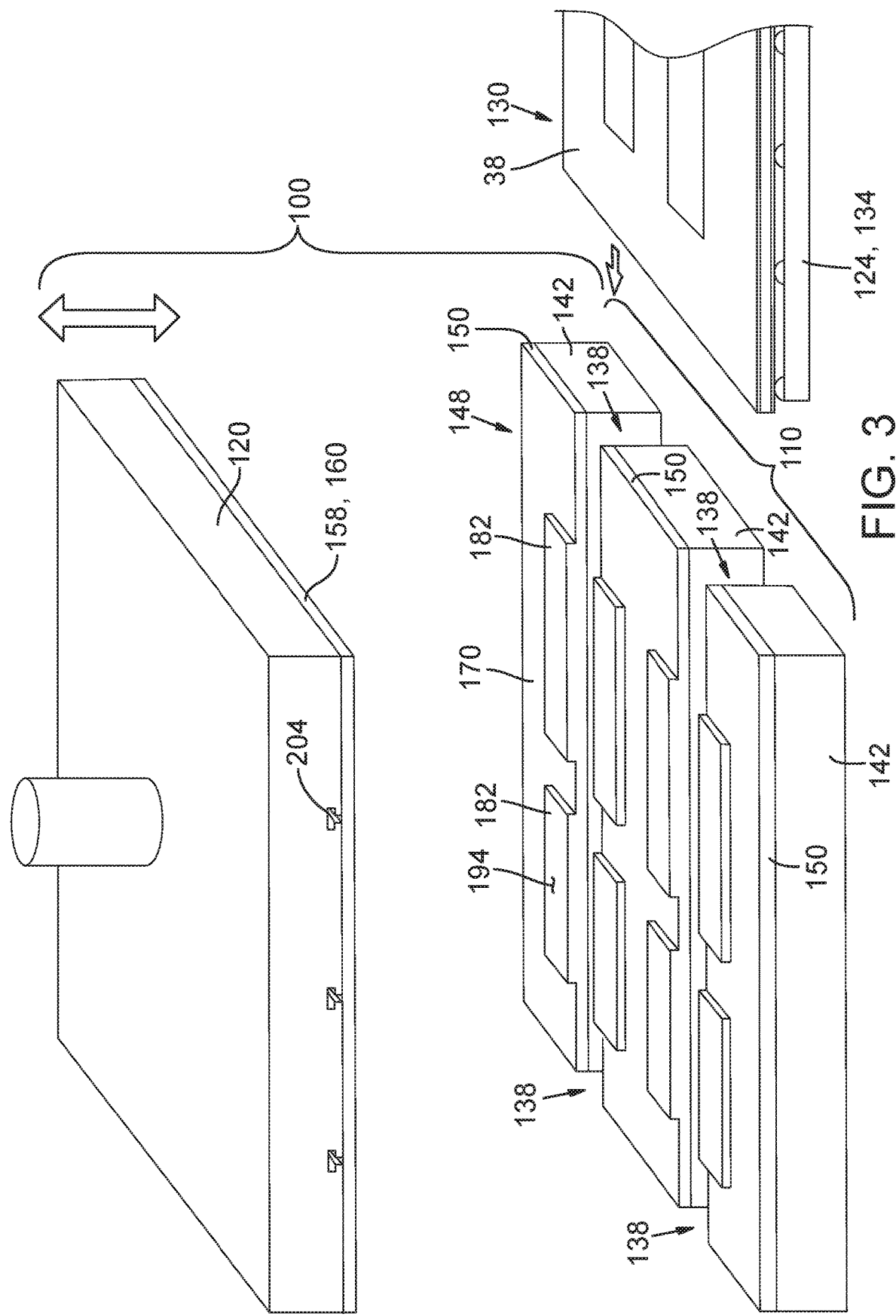
FIG. 3 is a pictorial schematic illustration of a press system for pressing together components of a recessed panel door, illustrated partially.

Methods of assembling door 10 will now be described with reference to an exemplary pressing system illustrated in FIGS. 3-4. Turning to FIG. 3, the system includes a press 100 (illustrated schematically) for pressing together components of a door 10, so as to ensure positive contact between adhesive-coated surfaces of the internal frame 20 with door skins 34, 38. The pressing operation also compresses the core 26 between the recessed panel regions 56, 86 of door skins 34, 38, as will be further described below. Subsequent to pressing in press 100, the pressed door assembly may be transferred to a separate heated press for curing the adhesive, then trimmed, finished, and packaged for shipment or sale.

Press 100 includes a lower platen 110 and an upper platen 120. In the embodiment illustrated, a workpiece transport and positioning subsystem 124, described below with reference to FIG. 4, feeds a partially pre-assembled and stacked collection of door components 130, laid flat, into press 100. Door components 130 include first and second door skins 34, 38 stacked on either side of frame 20 and core 26. The workpiece transport and positioning subsystem 124 aligns the door components 130 relative to the press 100, and ejects the pressed door components 130 from the press 100 after pressing. For example, lower platen 110 may be segmented to accommodate tracks of a roller conveyor 134 (FIG. 4) in channels or gaps 138 between segments 142 of lower platen 110. In a preferred embodiment, the roller conveyor 134 and an alignment mechanism 146 of the workpiece transport and positioning subsystem 124 are moveable to align door components 130 with each other and relative to press 100 and then to retract, so as not to interfere with the pressing operation.

Press 100 includes a lower die 148 comprising one or more lower die sections (or lower jigs) 150 seated on lower platen 110, and an upper die 158 comprising one or more upper die sections (or upper jigs) 160 attached to upper platen 120. In the embodiment illustrated, the lower die 148 includes three lower die sections 150, each of which is seated on one of the three segments 142 of lower platen 110, and the upper die 158 includes one upper die section 160 attached to upper platen 120. In other embodiments, a greater or lesser number of platen sections and/or die sections may be utilized. The lower die sections 150 are configured as a set, to collectively fit one or more particular door designs. Each of lower die sections 150 includes a base 170, having a bottom surface (seating surface) 176 which rests on lower platen 110, and at least one raised section 182 opposite bottom surface 176 and protruding from base 170. Consistent with the configuration and proportions of recessed panel portions 56 relative to first planar portion 50, each raised section 182 is generally narrower and shorter than base 170, and therefore has a smaller surface area than base 170. In the embodiment illustrated, each of the lower die sections 150 has multiple raised sections 182, which are sized and arranged to support the multiple recessed panel portions 56 of first door skin 34 during pressing (which may sometimes span the gaps 138 during a pressing operation). Raised sections 182 have a height above base 170 corresponding to the depth of recessed panel portions 56 of first door skin 34 inwardly of first planar portion 50. Each raised section 182 has a panel-supporting contact surface 194 opposite bottom surface 176 and facing away from lower platen 110. In yet another embodiment, base 170 is omitted, such that each lower die section 150 comprises only a single raised section 182 directly attached to the lower platen 110 so that the exposed platen surrounds each such raised section 182. Alternatively, base 170 may have a width and length that entirely underlie raised section 182.

Figure 4:
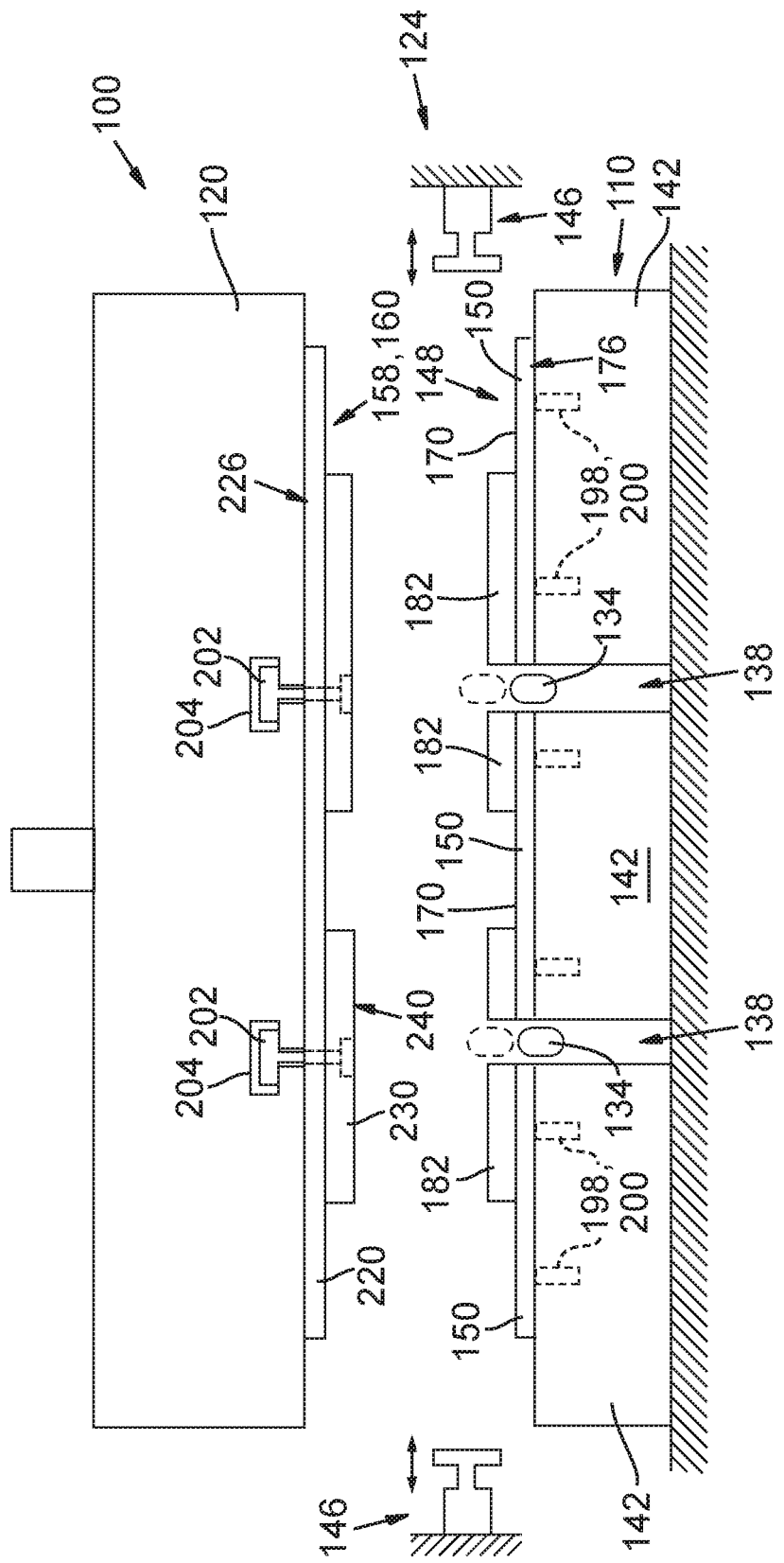
FIG. 4 is a schematic elevation view of the press system of FIG. 3.

With reference to FIG. 4, in the embodiment illustrated, upper die section 160 of upper die 158 is secured to upper platen 120 by mounting bolts and T-nuts 202 captured within T-slots 204 in upper platen 120, or by any other convenient means of securement. Similarly to lower die sections 150, upper die section 160 includes a base 220 having a seating surface (top surface) 226 that is held adjacent upper platen 120, and at least one raised section 230 opposite seating surface 226 and protruding from base 220. Consistent with the configuration and proportions of recessed panel portions 86 relative to second planar portion 80, each raised section 230 is generally narrower and shorter than base 220, and therefore has a smaller surface area than base 220. In the embodiment illustrated, each of the upper die sections 160 has multiple raised sections 230, which are sized and arranged to support the multiple recessed panel portions 86 of second door skin 38 during pressing. Raised sections 230 have a height beyond base 220 corresponding to the depth of recessed panel portions 86 of second door skin 38 inwardly of second planar portion 80. Each raised section 230 has a panel-supporting contact surface 240 opposite seating surface 226 and facing away from upper platen 120.

Continuing with reference to FIG. 4, lower die sections 150 are positioned on lower platen 110 adjacent gaps 138. Each of the lower die sections 150 includes one or more pegs 198 protruding from bottom surface 176 and arranged to engage with holes 200 or depressions in lower platen 110, for aligning each of lower die sections 150 on lower platen 110. Preferably, each of lower die sections 150 has two pegs 198 slidably fitted in two holes 200 when lower die sections 150 are seated against lower platen 110 to inhibit rotation or sliding of each lower die section 150 along the surface of lower platen 110. Orientation of lower die sections 150 on lower platen 110 using only pegs 198 makes it possible to remove and change out lower die sections 150 without the use of wrenches or other tools. Alternative means for positioning lower die sections 150 on lower platen 110 may also be provided according to a configuration of slots and protrusions or according to other mating or nesting configurations.

Lower and upper die sections 150, 160, and particularly the portions thereof that come into contact with door skins 34, 38 during pressing, such as contact surfaces 194, 240, are preferably made of a relatively soft, low-friction material, such as white polytetrafluoroethylene (PTFE) or another plastic material or a resilient or elastomeric material such as hard non-marking rubber. The working surfaces of die sections 150, 160, or at least contact surfaces 194, 240, are preferably non-marring by being made of or coated with relatively soft, low friction materials that tend not to scratch or damage door skins 34, 38 during pressing. For example, die sections 150, 160 may be made of a plastic material having a hardness in the range of about 80 to 110 Shore A or more preferably in the range of about 90 to 105 Shore A; and having a coefficient of static friction against polished steel of less than about 0.4, or less than 0.15, or preferably less than 0.1, or even less than 0.08, measured in accordance with ASTM D1894. Such materials are also desirably light weight, which may facilitate installation and change-over of die sections 150, 160 in press 100. Thus, the system may further include additional sets of one or more replacement die sections removably attachable to platens 110, 120 in place of one or more of lower and upper die sections 150, 160, for pressing different sizes or styles of doors.

Lower and upper die sections 150, 160 are designed and arranged so that when the stack of door components 130 is positioned within press 100 for pressing, each one of the raised sections 182, 230 fits within one of recessed panel portions 56, 86 of the respective door skins 34, 38. One purpose of raised sections 182 is to reinforce and support the recessed panel portions 56, 86 during pressing by press 100. Reinforcement provided by raised sections 182, 230 ensures door skins 34, 38 do not fracture or bow outwardly from frame 20 due to outward pressure exerted by core 26 during the pressing operation. Such reinforcement and the attendant crushing of core 26 also ensures that positive adhesive contact is established and thereafter maintained between door skins 34, 38 and frame 20. It is not necessary that contact surfaces 194, 240 span the full length or width of recessed panel portions 56, 86. Sufficient reinforcement can be achieved with discontinuous contact surfaces or segmented raised sections having a smaller width, length, and area than the recessed panel portions 56, 86.

The bases 170, 220 of each of the respective lower and upper die sections 150, 160 lie adjacent the stiles and rails regions of door skins 34, 38 (i.e. first and second planar portions 50, 80) during pressing. It is not necessary that the bases 170, 220 span any dimension entirely of planar portions 50, 80, but preferably bases 170, 220 extend beyond the edges of the planar portions 50, 80. In one embodiment, the heights of the raised sections 182, 230 are approximately equal to or slightly greater than the depths of the respective recessed panel portions 56, 86. In embodiments wherein raised sections 182, 230 have a height above their respective bases 170, 220 that is greater than the depth of recessed panel portions 56, 86, the bases 170, 220 may not come into contact with first and second planar portions 50, 80. Instead, pressure applied by raised sections 182, 230 against panel portions 56, 86 may both crush the core 26 and ensure positive adhesive contact between door skins 34, 38, frame 20, and the adhesive layer applied therebetween. Alternatively, during pressing, the height of raised sections 182, 230 being slightly greater than the depth of recessed panel portions 56, 86 may cause the door skins 34, 38 to bow slightly inward during the pressing process until bases 170, 220 come to press against planar portions 50, 80 and establish adhesive contact between door skins 34, 38 and frame 20. Inherent resiliency of the door skins 34, 38 and core 26 may return the door skins 34, 38 to their desired flatness after pressing.

During operation, roller conveyor 134 transports the door components 130 into press 100 (wherein roller conveyor 134 is in the raised position indicated by phantom lines in FIG. 4). Roller conveyor 134 pushes door components 130 into contact with positioning guides or stops (not illustrated) within the press to align the door components 130 longitudinally within press 100 and relative to each other. Concurrently, one or more alignment mechanisms 146 may momentarily push against one or more side edges of the door components 130 to establish their lateral alignment within the press 100. The alignment mechanisms 146 and positioning guides or stops (not shown) are then retracted before the press platens are closed. In another embodiment, the insertion of door components 130 into press 100 is accomplished manually or by some other means than conveyor 134. In such an embodiment, lower platen 110 may not include channels or gaps 138, in which case a single lower die section may replace the plurality of lower die sections 150. Returning to the embodiment illustrated, roller conveyor 134 retracts beneath the upper surface of lower platen 110 (as shown by solid lines in FIG. 4), or at least beneath the upper surface of base 170, placing the stack of door components 130 onto lower die sections 150.

During the pressing operation, first door skin 34 moves toward frame 20 a distance approximately equal to the depth of recessed panel portions 56. This motion causes the inner surface 42 of first door skin 34 to be pressed into adhesive contact against the adhesive coating on frame 20. This motion also causes the recessed panel portions 56 of first door skin 34 to crush (or deform or compress) the portions of core 26 that lie beneath recessed panel portions 56.

After pressing door components 130 to form an assembled door 10, the press 100 opens by at least one of lower platen 110 and upper platen 120 moving away from the other. The roller conveyor 134 of workpiece transport and positioning subsystem 124, lifts the pressed assembled door 10 off of lower die sections 150 until door 10 clears lower die 148 so that it can be transported out of press 100 by motorized rollers of roller conveyor 134. After the pressing operation in press 100, door 10 may be fed to a separate heated press station (not shown) for curing the adhesive bonds between door skins 34, 38 and frame 20. Alternatively, the press 100 may be heated, eliminating the need for a separate heated press.

It will be obvious to those having skill in the art that many changes may be made to the details of the above-described embodiments without departing from the underlying principles of the invention. The scope of the present invention should, therefore, be determined only by the following claims.

The invention claimed is:

1. A method for making a door assembly of the kind having an internal frame, a core, and first and second door skins attached to the frame on either side of the core, wherein each of the door skins has a planar portion bordering at least one recessed panel portion, said method comprising:

seating a lower die section against a lower platen of a press so that a base of the lower die section is supported on the lower platen and a raised section of the lower die section stands off from the base thereof;

attaching an upper die section to an upper platen of the press so that a base of the upper die section is supported by the upper platen and a raised section of the upper die section stands off from the base thereof;

positioning a stack of door components within the press, including:

positioning a first door skin in the press with a recessed panel portion of the first door skin facing downward and contacting the raised section of the lower die section, positioning a frame in the press over the first door skin, the frame defining a cavity, positioning a compressible core in the press overlying the first door skin and within the cavity defined by the frame, and positioning a second door skin in the press overlying the compressible core and the frame, with a recessed panel portion of the second door skin facing upward;

closing the press so that the raised section of the upper die section contacts the recessed panel portion of the second door skin; and pressing the stack of door components between the lower and upper platens of the press with the recessed panel portions of the first and second door skins supported by the raised sections of the lower and upper die sections, respectively, so that the recessed panel portions compress and deform a portion of the compressible core of the door assembly underlying the recessed panel portions, to thereby form a door assembly.

2. The method of claim 1, further comprising removing the upper and lower die sections from the press and installing a set of replacement die sections for pressing a second style of door, including installing a lower replacement die section on the lower platen and attaching an upper replacement die section to the upper platen.

3. The method of claim 1, wherein:

the stack of door components includes an adhesive between the first door skin and the frame, and between the second door skin and the frame; and wherein the pressing of the stack of door components results in adhesive contact between the first door skin and the frame, and between the second door skin and the frame.

4. The method of claim 3, further comprising, after forming the door assembly, transferring the door assembly to a separate heated press and pressing the door assembly in the separate heated press to cure the adhesive.

5. The method of claim 1, wherein the lower and upper die sections are made of a plastic material.

6. The method of claim 1, wherein the lower and upper die sections include non-marring contact surfaces which contact the recessed panel portions of the respective first and second door skins when the press is closed.

7. The method of claim 1, wherein the lower and upper die sections are made of a resilient material.

8. The method of claim 1, wherein the lower and upper die sections are made of a material having a coefficient of static friction against polished steel of less than 0.15.

9. The method of claim 1, wherein the lower and upper die sections are made of PTFE.

10. The method of claim 1, wherein the raised sections of the lower and upper die sections have a smaller surface area than the recessed panel portions of the respective first and second door skins.

11. The method of claim 1, wherein the lower die section includes at least one peg depending downwardly from the base of the lower die section and inserted into a hole in the lower platen to align the lower die section with the lower platen.

12. The method of claim 1, wherein one or both of the lower and upper die sections has multiple raised sections sized and arranged to support multiple recessed panel portions during pressing.

13. The method of claim 1, wherein the stack of door components are positioned in the press via a workpiece transport and positioning subsystem that transports a pre-stacked collection of the door components into the press.

14. The method of claim 1, wherein the height of the raised sections above the base of the respective lower and upper die sections is such that, during the pressing of the stack of door components, the base of the of the lower die section contacts the planar portion of the first door skin and the base of the upper die section contacts the planar portion of the second door skin.

15. The method of claim 1, wherein the pressing of the stack of door components between the lower and upper platens of the press causes the recessed panel portions to crush a portion of the compressible core of the door assembly underlying the recessed panel portions.

* * * * *